(12) United States Patent
Wang et al.

(10) Patent No.: US 10,853,779 B1
(45) Date of Patent: Dec. 1, 2020

(54) SYSTEM AND METHOD FOR MOBILE PAY

(71) Applicant: Visa International Service Association, San Francisco, CA (US)

(72) Inventors: Sheng Wang, Austin, TX (US); Hangqi Zhao, Austin, TX (US); Shizhe Ma, Austin, TX (US); Chiranjeet Chetia, Round Rock, TX (US); Shubham Agrawal, Round Rock, TX (US)

(73) Assignee: Visa International Service Association, San Francisco, CA (US)

( * ) Notice: Subject to any disclaimer, the term of this patent is extended or adjusted under 35 U.S.C. 154(b) by 28 days.

(21) Appl. No.: 16/406,409

(22) Filed: May 8, 2019

(51) Int. Cl.
| | |
|---|---|
| *G06Q 20/14* | (2012.01) |
| *G06Q 20/32* | (2012.01) |
| *G06K 9/00* | (2006.01) |
| *G06T 7/70* | (2017.01) |
| *G06K 9/20* | (2006.01) |
| *G06K 9/46* | (2006.01) |

(52) U.S. Cl.
CPC ......... *G06Q 20/14* (2013.01); *G06K 9/00469* (2013.01); *G06K 9/2054* (2013.01); *G06K 9/46* (2013.01); *G06Q 20/3223* (2013.01); *G06T 7/70* (2017.01); *G06K 2209/01* (2013.01); *G06T 2207/30176* (2013.01)

(58) Field of Classification Search
USPC ..................................................... 705/35, 40
See application file for complete search history.

(56) References Cited

U.S. PATENT DOCUMENTS

| | | | |
|---|---|---|---|
| 7,958,049 B2 | 6/2011 | Jamison et al. | |
| 8,433,654 B2 | 4/2013 | Subbarao et al. | |
| 9,760,871 B1* | 9/2017 | Pourfallah | G06Q 20/401 |
| 2007/0214078 A1 | 9/2007 | Coppinger | |
| 2012/0089509 A1* | 4/2012 | Kasriel | G06Q 20/102 |
| | | | 705/40 |
| 2012/0136780 A1* | 5/2012 | El-Awady | G06Q 20/14 |
| | | | 705/40 |
| 2014/0244490 A1 | 8/2014 | Miller et al. | |
| 2016/0071074 A1* | 3/2016 | Baird | G06Q 20/14 |
| | | | 705/40 |

FOREIGN PATENT DOCUMENTS

CN          105989075 A   * 10/2016

OTHER PUBLICATIONS

A Web Services Integration to Manage Invoice Identification, Metadata Extraction, Storage and Retrieval in a Multi-tenancy Saas Application Thomas Kwok, Jim Laredo and Sridhar Maradugu (Year: 2008).*

(Continued)

*Primary Examiner* — William E Rankins
(74) *Attorney, Agent, or Firm* — The Webb Law Firm

(57) ABSTRACT

Provided herein is a computer-implemented method for settling an outstanding invoice issued by a payee, including the steps of capturing a digital image of an invoice issued by a payee to a payor, processing the digital image to identify invoice data and a network location associated with the payee, automatically establishing communication with the network location identified in the digital image, and automatically inputting payment information into one or more fields of the webpage at the network location.

21 Claims, 4 Drawing Sheets

(56) References Cited

OTHER PUBLICATIONS

"Bank of the West Launches Scan to Pay, One of the First, Most Accurate and Easiest Mobile Bill Payment Features in the U.S.", Feb. 26, 2015, https://www.bankofthewest.com/about-us/press-center/press-releases/details/2015-02-26-scan-to-pay-launch.html.
Microblink, "Erste Bank How PhotPay transformed customer experience: Erste Bank", https://microblink.com/use-cases/case-studies/erste-bank-case-study.
Microblink, "PhotoPay Scan payment slips and invoices to quickly pay bills.", https://microblink.com/products/photopay.

* cited by examiner

SYSTEM AND METHOD FOR MOBILE PAY

BACKGROUND OF THE DISCLOSURE

1. Field of the Disclosure

Disclosed embodiments relate generally to a system and method for automatically settling an invoice provided by a payee to a payor and, in one particular embodiment or aspect, to a system and method for settling an invoice with a mobile device, where a network location of a bill-pay website is extracted from text presented in an image of an invoice, and payment information is entered into one or more fields in the bill-pay website to settle the invoice.

2. Technical Considerations

Settlement of invoices for goods and services has traditionally been limited to use of regular mail to transmit a personal check. This model is fraught with pitfalls, such as a payor forgetting to settle an invoice and incurring late fees. Technological developments have allowed for developments in electronic commerce in terms of how invoices for goods and services are settled. However, despite these developments, advances have been limited and have pitfalls of their own.

Currently, individual payors can log into a payee's bill-pay website and settle an invoice by entering payment details therein. However, this process requires a payee to memorize or otherwise store a payee's network location (e.g., Uniform Resource Locator) (URL), login credentials, and payment information. Moreover, while payees have begun communicating invoices via email, with embedded hyperlinks for a corresponding bill-pay website, there is an increased risk of a fraudster sending a fraudulent link and obtaining a payor's information.

Accordingly, there is a need in the art for a system and method for enabling an invoice to be settled securely and quickly. Such a solution is possible when a mobile device can extract network location information from an invoice and automatically input necessary information into a payee's bill-pay website.

SUMMARY OF THE DISCLOSURE

According to a non-limiting embodiment or aspect, provided herein is a computer-implemented method for settling an outstanding invoice issued by a payee, including the steps of capturing, with at least one processor and via an image capture device of a mobile device associated with a payor, a digital image of an invoice issued by a payee to the payor; processing, with at least one processor, the digital image to identify in the digital image: (i) invoice data and (ii) a network location associated with the payee; automatically establishing, with at least one processor, communication with the network location identified in the digital image, the network location being a bill-pay website; and automatically inputting, with at least one processor, payment information into one or more fields of the bill-pay website, the payment information including the invoice data and an account identifier associated with the payor.

According to another non-limiting embodiment or aspect, provided herein is a system for settling an outstanding invoice issued by a payee, the system including an image capture device and a processor programmed or configured to capture, via the at least one image capture device, a digital image of an invoice issued by a payee to a payor; process the digital image to identify in the digital image: (i) invoice data and (ii) a network location associated with the payee; automatically establish communication with the network location identified in the digital image, the network location being a bill-pay website; and automatically input payment information into one or more fields of the bill-pay website, the payment information including the invoice data and an account identifier associated with the payor.

According to another non-limiting embodiment or aspect, provided herein is a computer program product for settling an outstanding invoice issued by a payee, including at least one non-transitory computer-readable medium including program instructions that, when executed by at least one processor, cause the at least one processor to: capture, via at least one image capture device, a digital image of an invoice issued by a payee to a payor; process the digital image to identify in the digital image: (i) invoice data and (ii) a network location associated with the payee; automatically establish communication with the network location identified in the digital image, the network location being a bill-pay website; and automatically input payment information into one or more fields of the bill-pay website, the payment information including the invoice data and an account identifier associated with the payor.

Further embodiments or aspects are set forth in the following numbered clauses:

Clause 1: A computer-implemented method for settling an outstanding invoice issued by a payee, comprising: capturing, with at least one processor and via an image capture device of a mobile device associated with a payor, a digital image of an invoice issued by a payee to the payor; processing, with at least one processor, the digital image to identify in the digital image: (i) invoice data and (ii) a network location associated with the payee; automatically establishing, with at least one processor, communication with the network location identified in the digital image, the network location comprising a bill-pay website; and automatically inputting, with at least one processor, payment information into one or more fields of the bill-pay website, the payment information comprising the invoice data and an account identifier associated with the payor.

Clause 2: The computer-implemented method of clause 1, wherein the network location comprises a Uniform Resource Locator (URL) printed on the invoice.

Clause 3: The computer-implemented method of clause 1 or clause 2, wherein the invoice data comprises at least one of the following: an account identifier; a payor identifier; a payee identifier; an invoice amount; or any combination thereof.

Clause 4: The computer-implemented method of any of clauses 1-3, further comprising launching an electronic wallet application on the mobile device prior to capturing the digital image of the invoice.

Clause 5: The computer-implemented method of any of clauses 1-4, wherein the account identifier is obtained from the electronic wallet application.

Clause 6: The computer-implemented method of any of clauses 1-5, wherein the electronic wallet application processes the digital image, establishes the communication with the network location identified in the digital image, and inputs the payment information.

Clause 7: The computer-implemented method of any of clauses 1-6, wherein user input is required prior to submitting the payment information to the payee.

Clause 8: The computer-implemented method of any of clauses 1-7, wherein the mobile device processes the digital image.

Clause 9: The computer-implemented method of any of clauses 1-8, wherein a remote server processes the digital image and communicates the invoice data and the network location data to the mobile device.

Clause 10: The computer-implemented method of any of clauses 1-9, wherein processing the digital image comprises: extracting text from the digital image; generating, based at least in part on a location and/or pattern of the extracted text on the invoice, location and/or pattern data; and identifying, based at least in part on the location data and/or the pattern data, at least one of the following: a network location; an account identifier; a payor identifier; a payee identifier; and an invoice amount.

Clause 11: The computer-implemented method of any of clauses 1-10, wherein processing the digital image comprises: identifying at least one field in the digital image, wherein the at least one field comprises text; and identifying, based at least on a regular expression, a network location in the at least one field.

Clause 12: The computer-implemented method of any of clauses 1-11, wherein the regular expression is generated at least in part on a general network location string.

Clause 13: The computer-implemented method of any of clauses 1-12, wherein the regular expression comprises at least one keyword.

Clause 14: The computer-implemented method of any of clauses 1-13, wherein the at least one field is identified based at least in part on at least one keyword.

Clause 15: The computer-implemented method of any of clauses 1-14, further comprising: identifying, in the digital image, a position of the at least one field, wherein the position of the at least one field comprises an x,y coordinate.

Clause 16: The computer-implemented method of any of clauses 1-15, further comprising: identifying one or more additional fields based at least in part on the x,y coordinate of the at least one field; and identifying, based at least in part on a regular expression, a network location in the one or more additional text fields.

Clause 17: A system for settling an outstanding invoice issued by a payee, comprising: at least one image capture device; and at least one processor in communication with the at least one image capture device, the at least one processor programmed or configured to: capture, with the at least one image capture device, a digital image of an invoice issued by a payee to a payor; automatically process the digital image to identify in the digital image: (i) invoice data and (ii) a network location associated with the payee; automatically establish communication with the network location identified in the digital image, the network location comprising a bill-pay website; and automatically input payment information into one or more fields of the bill-pay website, the payment information comprising the invoice data and an account identifier associated with the payor.

Clause 18: The system of clause 17, wherein the at least one processor processes the digital image.

Clause 19: The system of clause 17 or clause 18, wherein the at least one processor is further programmed or configured to: communicate the digital image to a remote server that processes the digital image; and receive, from the remote server, the invoice data and the network location data.

Clause 20: The system of any of clauses 17-19, wherein the at least one processor is programmed or configured to process the digital image by: extracting text from the digital image; generating, based at least in part on a location and/or pattern of the extracted text on the invoice, location and/or pattern data; and identifying, based at least in part on the location data and/or the pattern data, at least one of the following: a network location; an account identifier; a payor identifier; a payee identifier; and an invoice amount.

Clause 21: The system of any of clauses 17-20, wherein the network location comprises a Uniform Resource Locator (URL) printed on the invoice.

Clause 22: The system of any of clauses 17-21, wherein the invoice data comprises at least one of the following: an account identifier; a payor identifier; a payee identifier; an invoice amount; or any combination thereof.

Clause 23: The system of any of clauses 17-22, wherein the at least one processor is further programmed or configured to launch an electronic wallet application prior to capturing the digital image of the invoice.

Clause 24: The system of any of clauses 17-23, wherein the at least one processor is further programmed or configured to identify at least one field in the digital image, wherein the at least one field comprises text; and identify, based at least on a regular expression, a network location in the at least one field.

Clause 25: The system of any of clauses 17-24, wherein the regular expression is generated at least in part on a general network location string.

Clause 26: The system of any of clauses 17-25, wherein the regular expression comprises at least one keyword.

Clause 27: The system of any of clauses 17-26, wherein the at least one field is identified based at least in part on at least one keyword.

Clause 28: The system of any of clauses 17-27, wherein the at least one processor is further programmed or configured to identify, in the digital image, a position of the at least one field, wherein the position of the at least one field comprises an x,y coordinate.

Clause 29: The system of any of clauses 17-28, wherein the at least one processor is further programmed or configured to identify one or more additional fields based at least in part on the x,y coordinate of the at least one field; and identify, based at least in part on a regular expression, a network location in the one or more additional text fields.

Clause 30: The system of any of clauses 17-29, wherein the at least one processor is programmed or configured to, based on user input, launch an electronic wallet application.

Clause 31: The system of any of clauses 17-30, wherein the at least one processor is further programmed or configured to obtain the account identifier from the electronic wallet application.

Clause 32: The system of any of clauses 17-31, wherein the at least one processor processes the digital image, establishes the communication with the network location identified in the digital image, and inputs the payment information through the electronic wallet application.

Clause 33: A computer program product for settling an outstanding invoice issued by a payee, comprising at least one non-transitory computer-readable medium including program instructions that, when executed by at least one processor, cause the at least one processor to perform the computer-implemented method of any of clauses 1-16.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details are explained in greater detail below with reference to the exemplary embodiments and aspects that are illustrated in the accompanying figures, in which.

DESCRIPTION

Figure 1:
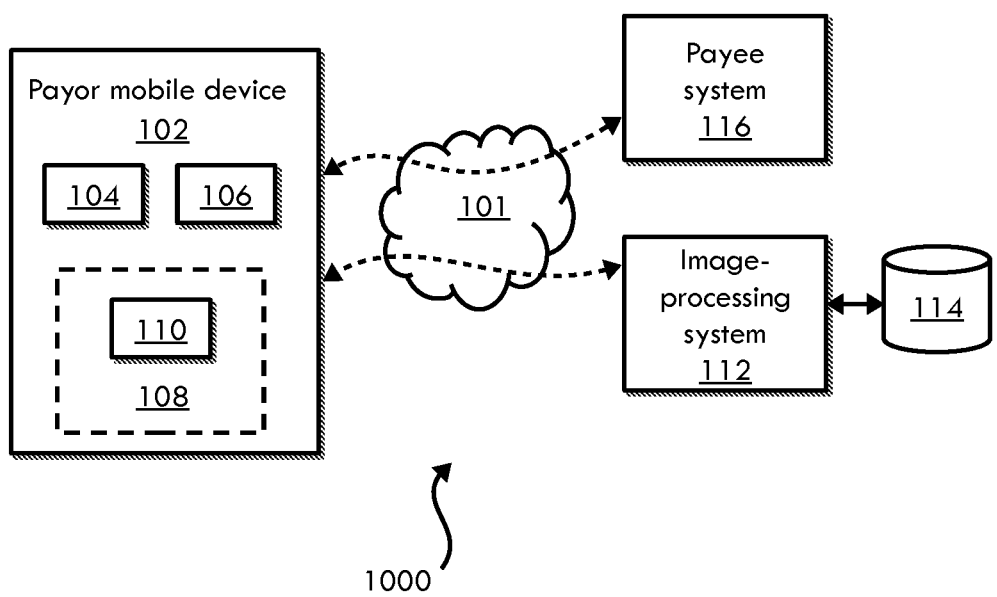
FIG. 1 is a schematic diagram of one non-limiting embodiment or aspect of a system for settling an invoice.

For purposes of the description hereinafter, the terms "upper," "lower," "right," "left," "vertical," "horizontal," "top," "bottom," "lateral," "longitudinal," and derivatives thereof shall relate to the orientation shown in the drawing figures. However, it is to be understood that the systems and methods disclosed herein may assume various alternative variations and step sequences, except where expressly specified to the contrary. It is also to be understood that the specific devices and the method illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "payee" refers to any individual or entity that provides goods and/or services, or access to goods and/or services, to customers based on a transaction, such as a payment transaction, and issues an invoice for the same. Payees may include merchants such as, but not limited to, restaurants, food trucks, clubs, gymnasiums, retail stores, professional services providers (e.g., dentists, doctors, plumbers, etc.), parks, museums, attractions, sporting venues, and/or the like. It will be appreciated that numerous other types of payees are within the scope of this disclosure.

As used herein, the term "payor" refers to any individual or entity that purchases, leases, rents, or otherwise takes possession (temporarily or permanently) of goods or utilizes services, and who receives an invoice or bill for such goods and/or services from a payee.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "account identifier" may include one or more primary account numbers (PANs), tokens, or other identifiers associated with a payor account. An account identifier may be directly or indirectly associated with an issuer institution, such that an account identifier may be a token that maps to a PAN or other type of account identifier. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifiers in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

Non-limiting embodiments or aspects of the systems and methods described herein provide for a system and method of settling an invoice by processing an image of an invoice to extract invoice data and/or a network location comprising a bill-pay website associated with the payee, and automatically establishing communication with the network location and inputting payment information into one or more fields of the bill-pay website. As used herein, the term "automatically" means that an action is executed without being specifically initiated by a user. Through the use of a mobile device, text extraction, automatic establishment of communication, and completion of fields in a bill-pay website, the payor experiences decreased exposure of sensitive information in terms of risk of clicking on hyperlinks in emails from fraudsters purporting to be legitimate payees, and reduced need to keep written records of account and payment information, which can further reduce exposure for the payor. The systems and methods disclosed herein provide a technological solution to existing methods of settling invoices.

With reference to FIG. 1, in some non-limiting embodiments or aspects, provided is a system 1000 for settling an outstanding invoice issued by a payee. The system 1000 includes a processor programmed or configured to undertake certain steps, including capturing a digital image of an invoice, processing the digital image of the invoice, and establishing communication with a bill-pay website. In non-limiting embodiments or aspects, system 1000 includes a user (e.g., payor) mobile device 102. As will be described more fully below, in non-limiting embodiments or aspects, the systems and methods described herein can be implemented on user mobile device 102 without the need for a separate image processing system. In non-limiting embodiments or aspects, one or more separate systems distinct from the user mobile device 102 can be used to carry out one or more steps of the method, for example, and without limitation, processing and/or analyzing the digital image.

User mobile device 102 may, in non-limiting embodiments or aspects, include an image capture device 104 for capturing a digital image of an invoice issued by a payee. User mobile device 102 may also include a processor 106 for implementing one or more steps of the computer-implemented method described herein. In non-limiting embodiments or aspects, user mobile device 102 includes non-transitory memory 108. In non-limiting embodiments or aspects, memory 108 stores one or more programs (e.g., software applications, such as those executable by a mobile device) for implementing the systems and methods described herein. In non-limiting embodiments or aspects, memory 108 stores an account identifier such as, for example, a token associated with a payor's payment device and/or PAN. In non-limiting embodiments or aspects, the token is stored within an electronic wallet application.

As described above, the processor 106 of the user mobile device 102 may be programmed or configured to capture, via control over the image capture device 104, at least one digital image of an invoice issued by a payee to the payor. In non-limiting embodiments or aspects, capturing the at least one digital image occurs within an electronic wallet application stored in non-transitory memory 108 of the user mobile device 102. That is, in non-limiting embodiments or aspects, a user opens an electronic wallet application on their mobile device 102 and selects an option for mobile bill pay, at which point the image capture device 104 is controlled and instructed to capture at least one digital image of the invoice. In some non-limiting embodiments or aspects, the mobile device 102 may utilize an existing camera application and import the resulting image to the electronic wallet application or any other application on the mobile device 102 through an API or any other means.

In non-limiting embodiments or aspects, processor 106 processes, for example and without limitation automatically processes, the at least one digital image to identify in the digital image invoice data and/or a network location associated with the payee. For example, the processor 106 may begin automatically processing the at least one digital image as soon as the digital image is available from the image capture device 104. In other examples, the processor 106 may begin processing the at least one digital image in response to user input (e.g., accepting a prompt or the like). In non-limiting embodiments or aspects, the invoice data includes at least one of an account identifier, a payor identifier, a payee identifier, an invoice amount, and/or any other identifying information. In non-limiting embodiments or aspects, the invoice data includes one or more of an account number, an invoice number, a purchase date, a lease/rental date or period, a merchant identifier, and/or an identification number (e.g., a taxpayer identification number). In non-limiting embodiments or aspects, the network location associated with the payee is a Uniform Resource Locator (URL) printed on the invoice. In non-limiting embodiments or aspects, the URL is a reference to a bill-pay webpage that can be hosted on a payee server/system 116. In non-limiting embodiments or aspects, an electronic wallet application processes the at least one digital image. In non-limiting embodiments or aspects, processing the at least one digital image includes optical character recognition (OCR), parsing the resulting text, and/or executing one or more natural language processing (NLP) algorithms on the text.

In non-limiting embodiments or aspects, rather than processing the at least one digital image on the user mobile device 102, the at least one digital image is communicated to a separate system, such as a server, for processing the digital image. In non-limiting embodiments or aspects, processing the at least one digital image includes OCR and/or NLP. In non-limiting embodiments or aspects, one or more characteristics of the digital image is stored in database 114, thereby allowing the system to reference known (e.g., previously encountered and/or predefined) patterns for quickly identifying invoice data and/or network location data. In non-limiting embodiments or aspects, once the digital image is processed, the processed image and/or resulting data is communicated to the user mobile device 102 for initiation of payment. In non-limiting embodiments or aspects, the processed image and extracted text (e.g., invoice data and/or network location data) are communicated back to the user mobile device 102. In non-limiting embodiments or aspects, only extracted text (e.g., invoice data and/or network location data) is communicated to the user mobile device 102.

In non-limiting embodiments or aspect, the at least one digital image is processed by extracting text from the at least one digital image. In non-limiting embodiments or aspects, the text is extracted using OCR and/or NLP. In non-limiting embodiments or aspects, following text extraction (occurring locally on the user mobile device 102 or remotely at an image processing system 112), the text is analyzed. In non-limiting embodiments or aspects, extracted text is analyzed based on position of the text on the invoice to generate position data. In non-limiting embodiments or aspects, the extracted text is analyzed based on a pattern and/or content of the text to generate pattern data and/or content data. In non-limiting embodiments or aspects, extracted text is analyzed based at least in part on both position of the text on the invoice (in isolation or in comparison to the position of other text) and a pattern and/or content of the text to generate position and pattern data and/or content data. Based at least on the position data and/or the pattern data and/or content data, invoice data (network location, account identifier, payor identifier, payee identifier, invoice amount, and/or any other identifying information) may be identified as described herein.

In non-limiting embodiments or aspects, the at least one digital image is further processed by identifying at least one field in the digital image. The field(s) may be text fields, image fields, or both. In non-limiting embodiments or aspects, the at least one field is a text field, and the text field is analyzed based at least in part on a regular expression (regex). In non-limiting embodiments or aspects, the regex is a sequence of characters for defining a search pattern through programmatic search functions. A regex may be generated for each field based on the format of the field and one or more expected characters or number of characters, as an example. Using regex, invoice data (account identifier, payor identifier, payee identifier, invoice amount, and/or any other identifying information), a network location, or both may be identified. In non-limiting embodiments or aspects, the regex includes or is based on at least a portion of a general network location string, for example, and without limitation, [www], [http], [https], [.com], [.net], [.store], [.shop], [.boutique], [/pay], or the like. In non-limiting embodiments or aspects, the regex includes or is based on one or more keywords, for example and without limitation, [pay], [payment], [bill], [invoice], [remit], [make], [payment], [online], and/or the like.

Figure 3:
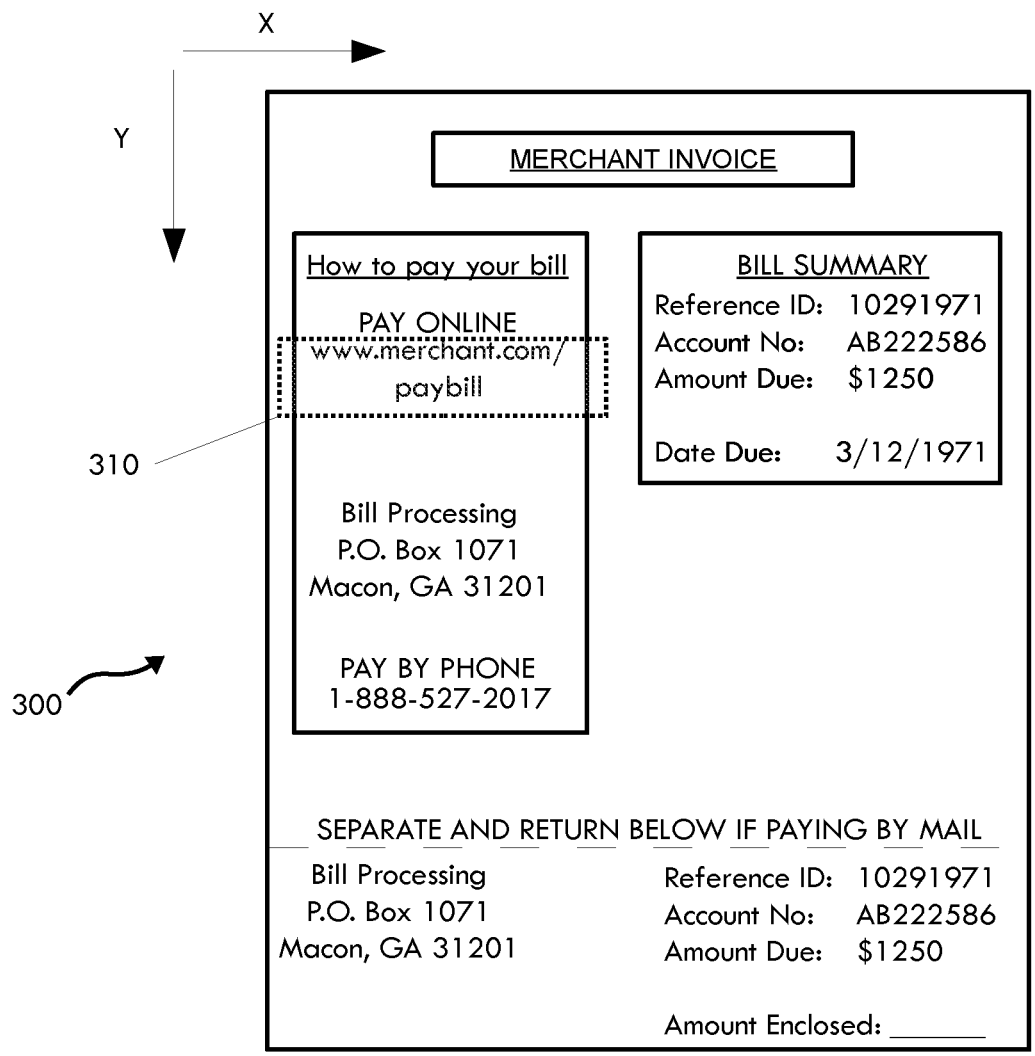
FIG. 3 is a sample invoice showing image processing according to one non-limiting embodiment or aspect.
Figure 4:
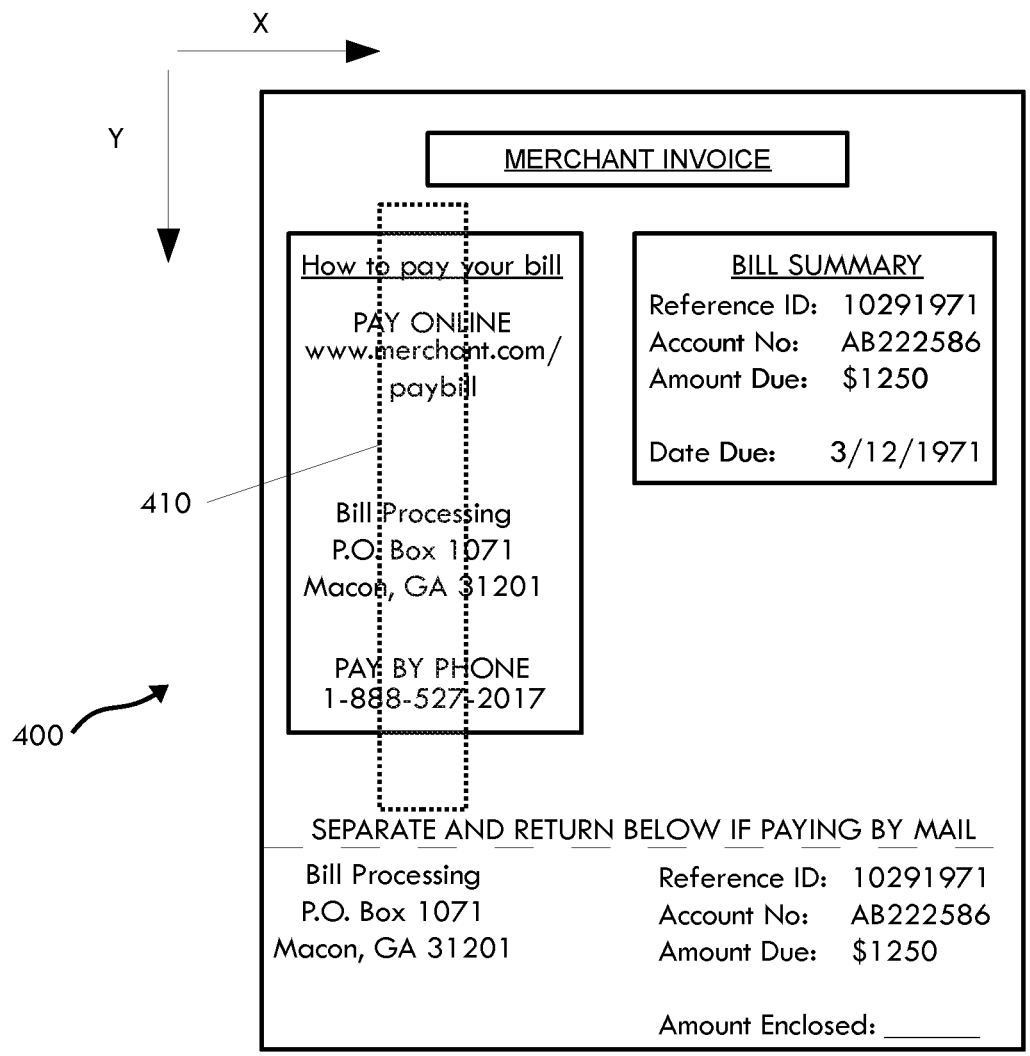
FIG. 4 is a sample invoice showing image processing according to one non-limiting embodiment or aspect.

In non-limiting embodiments or aspects, the at least one digital image is processed such that position data is generated. The position data may correspond to the location of one or more fields (e.g., text fields and/or image fields) and/or the position of extracted text. In non-limiting embodiments, the position data is generated based on a horizontal/vertical or x,y coordinate system (for example as shown in FIGS. 3 and 4). In non-limiting embodiments or aspects, the position data is absolute position data. In non-limiting embodiments or aspects, position data is relative position data such as, for example and without limitation, position of a string of text or a field relative to another string of text or another field.

While above embodiments or aspects of digital image processing are described separately, it should be understood that useful image processing techniques may include any type of technique in any combination and order. For example, and without limitation, digital image processing may include extracting text, analyzing text for content and/or pattern (e.g., based on regex), analyzing position of the text, and, based on one or more of the analyses, identifying a network location and/or invoice data.

In non-limiting embodiments or aspects, as described above, one or more characteristics of the at least one digital image is stored in database 114 and, based on techniques such as, for example and without limitation, machine learning and artificial intelligence, a system (e.g., image processing system 112) may conduct comparisons and/or refine its algorithms and techniques over time from prior digital images of invoices to improve the speed and accuracy of processing and analysis to identify useful fields and/or text and to match extracted text to required data (e.g., network location, account identifier, payor identifier, payee identifier, invoice amount, and/or any other identifying information).

With continuing reference to FIG. 1, following processing and analysis of the at least one digital image, in non-limiting embodiments or aspects, processor 106 establishes communication (e.g., establishes or initiates a connection), for example through network 101, to the network location identified in the at least one digital image of the invoice. In non-limiting embodiments or aspects, the network location is a bill-pay website associated with the payee and may be hosted by payee system 116. In non-limiting embodiments or aspects, establishing communication with the network location is carried out by and/or within an electronic wallet application. In non-limiting embodiments or aspects, establishing communication with the network location is carried out via a web browser.

In non-limiting embodiments or aspects, an electronic wallet application and/or processor 106 retrieves credentials for the payor for the network location (e.g., the bill-pay website) and automatically logs into the network location. In non-limiting embodiments or aspects, payor credentials (e.g., a username and/or password) are stored in memory 108. In non-limiting embodiments or aspects, the payor credentials are retrieved from a system separate from user mobile device 102 (e.g., a remote server).

Once communication with the network location (e.g., a bill-pay website) is established, in non-limiting embodiments or aspects, the processor 106 automatically inputs payment information into one or more fields of the bill-pay website. In non-limiting embodiments or aspects, one or more web crawlers (optionally included in an electronic wallet application or other application that includes the bill-pay functionality described herein) are used to parse and complete the fields to access the bill-pay website and input payment information into one or more fields of the bill-pay website. It will be appreciated that the fields may be populated through simulated user-interaction (e.g., simulated mouse movements and/or keyboard inputs), through a web browser plug-in, and/or in any other manner. In non-limiting embodiments or aspects, the payment information includes at least one of the invoice data and an account identifier. In non-limiting embodiments or aspects, the account identifier is a token. In non-limiting embodiments or aspects, the account identifier is retrieved from an electronic wallet application. In non-limiting embodiments or aspects, an electronic wallet application automatically inputs the payment information into one or more fields of the bill-pay website. In non-limiting embodiments or aspects, user input is required prior to submitting payment. In non-limiting embodiments or aspects, the user input includes one or more of biometric data (e.g., a fingerprint or facial recognition scan), a username and/or password, two-factor authentication, selecting "confirm," "submit," "transmit," and/or the like.

Figure 2:
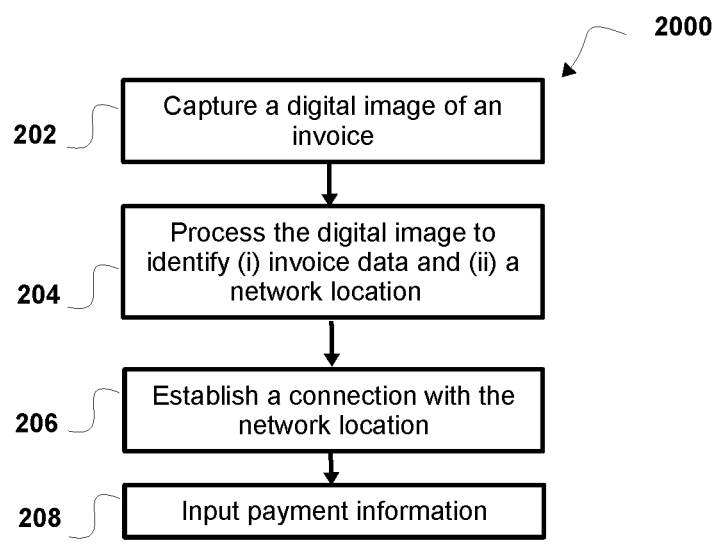
FIG. 2 is a flowchart of one non-limiting embodiment or aspect of a computer-implemented method for settling an invoice.

A system as described herein may be used in a computer-implemented method of settling an invoice issued by a payee. With reference to FIG. 2, shown is a flow diagram of a method 2000 according to a non-limiting embodiment or aspect. In step 202, a digital image of an invoice is captured by at least one processor of a system, via at least one image capture device. As described above, the digital image may be captured through an electronic wallet application or other application that can be initiated and run on a mobile device. In step 204, the digital image is processed by one or more of the methods described above. For example, and without limitation, the digital image may be processed by extracting text, analyzing positional data, content data, and/or pattern data, and/or by identifying fields on the invoice based on text, position, content, and/or pattern. As described above, digital image processing may occur on a user mobile device or on a remote system. In step 206, communication is established with a network location, which may be a bill-pay website associated with the payee. As described above, the communication may be established through an electronic wallet application or other application that may be executed on a mobile device. In step 208, payment information, which may include an account identifier associated with payor, is inputted into one or more fields of the bill-pay website. In non-limiting embodiments or aspects, the account identifier is obtained from an electronic wallet application.

Turning to FIGS. 3 and 4, shown is a sample invoice 300, 400 showing image processing according to non-limiting embodiments or aspects described herein. A sample invoice may be processed by having text extracted, for example and without limitation, by using OCR and/or NLP. In some non-limiting embodiments or aspects, regex is used, for example and without limitation, a regex based on or including a general URL (e.g., [.com], [www], or the like, as described above). As an invoice may include more than one network location (e.g., a general website, a website for customer feedback, etc.), in some non-limiting embodiments or aspects, a regex may be generated that includes one or more keywords to increase the likelihood of identifying a network location specific for settling an invoice/paying a bill. As shown in FIG. 3, a text field is identified 310 that includes a network location and one or more relevant keywords ([pay], [bill]). While FIG. 3 shows processing of the invoice 300 in a horizontal (x) direction, a vertical orientation and parsing direction may be utilized as shown for example in text field 410 in the invoice 400 shown in FIG. 4. As in FIG. 3, a regex can be used to identify relevant fields based on a keyword, for example [pay], in FIG. 4. Based on the identification of a field 410 including the term [pay], position-based analysis as described herein may be employed to identify a network location.

As also described above, position-based analysis may be employed to identify relevant fields/text. In some non-limiting embodiments, position-based analysis may be employed following text identification (for example and without limitation regex). All text fields/boxes in a digital image of an invoice may be analyzed/searched for keywords or phrases (e.g., [pay], [pay online], [make a payment], and/or the like), and a position of one or more text fields including the keywords/phrases can be identified, for example in an x,y coordinate system. Based on the position (x,y coordinates) of the text field including the keyword(s), adjacent text boxes are searched (vertically and/or horizontally) for a network location based on logic described previously herein.

In non-limiting embodiments or aspects, the above-described approaches to processing the image may be performed together, sequentially or simultaneously, and an area of overlap may be determined to by, with a high level of confidence, the appropriate network location (or invoice data). For example, with further reference to FIGS. 3 and 4, text fields identified by a text-recognition method may include "www.merchant.com/paybill" and text fields identified by position may include "How to pay online," "Pay online," "pay by phone," "Bill Processing," and "www.merchant.com/paybill" fields. In non-limiting embodiments or aspects, a processor analyzes the fields and identifies overlapping field(s), such as "www.merchant.com/paybill" in the depicted example.

Although the systems and methods have been described in detail for the purpose of illustration based on what is currently considered to be the most practical and preferred embodiments, it is to be understood that such detail is solely for that purpose and should not be considered limiting, but on the contrary, is intended to cover modifications and equivalent arrangements that are within the spirit and scope of the appended claims. For example, it is to be understood that the present systems and methods contemplate that, to the extent possible, one or more features of any embodiment can be combined with one or more features of any other embodiment.

What is claimed is:

1. A computer-implemented method for settling an outstanding invoice issued by a payee, comprising:
   capturing, with at least one processor and via an image capture device of a mobile device associated with a payor, a digital image of an invoice issued by a payee to the payor;
   processing, with at least one processor, the digital image to identify in the digital image: (i) invoice data and (ii) a network location associated with the payee;
   automatically establishing, with at least one processor, communication with the network location identified in the digital image, the network location comprising a bill-pay website; and
   automatically inputting, with at least one processor, payment information into a plurality of fields of the bill-pay website, the payment information comprising at least a portion of the invoice data and an account identifier associated with the payor.

2. The computer-implemented method of claim 1, wherein the network location comprises a Uniform Resource Locator (URL) printed on the invoice.

3. The computer-implemented method of claim 1, wherein the invoice data comprises at least one of the following: an account identifier; a payor identifier; a payee identifier; an invoice amount; or any combination thereof.

4. The computer-implemented method of claim 1, further comprising launching an electronic wallet application on the mobile device prior to capturing the digital image of the invoice.

5. The computer-implemented method of claim 1, wherein the account identifier is obtained from an electronic wallet application executed on the mobile device.

6. The computer-implemented method of claim 5, wherein the electronic wallet application processes the digital image, establishes the communication with the network location identified in the digital image, and inputs the payment information.

7. The computer-implemented method of claim 1, further comprising submitting the inputted payment information from the bill-pay website in response to receiving user input, wherein the user input is received in response to a prompt presented to the user.

8. The computer-implemented method of claim 1, wherein the mobile device processes the digital image.

9. The computer-implemented method of claim 1, wherein a remote server processes the digital image and communicates the invoice data and the network location data to the mobile device.

10. The computer-implemented method of claim 1, wherein processing the digital image comprises:
   extracting text from the digital image;
   generating, based at least in part on a location and/or pattern of the extracted text on the invoice, location and/or pattern data; and
   identifying, based at least in part on the location data and/or the pattern data, at least one of the following: a network location; an account identifier; a payor identifier; a payee identifier; and an invoice amount.

11. The computer-implemented method of claim 1, wherein processing the digital image comprises:
   identifying at least one field in the digital image, wherein the at least one field comprises text; and
   identifying, based at least on a regular expression, a network location in the at least one field.

12. The computer-implemented method of claim 11, wherein the regular expression is generated at least in part on a predefined network location string.

13. The computer-implemented method of claim 1, further comprising:
   identifying, in the digital image, a position of the at least one field, wherein the position of the at least one field comprises an x,y coordinate;
   identifying one or more additional fields based at least in part on the x,y coordinate of the at least one field; and
   identifying, based at least in part on a regular expression, a network location in the one or more additional text fields.

14. A system for settling an outstanding invoice issued by a payee, comprising:
   at least one image capture device; and
   at least one processor in communication with the at least one image capture device, the at least one processor programmed or configured to:
      capture, with the at least one image capture device, a digital image of an invoice issued by a payee to a payor;
      process the digital image to identify in the digital image: (i) invoice data and (ii) a network location associated with the payee;
      automatically establish communication with the network location identified in the digital image, the network location comprising a bill-pay website; and
      automatically input payment information into one or more fields of the bill-pay website, the payment information comprising the invoice data and an account identifier associated with the payor.

15. The system of claim 14, wherein the at least one processor processes the digital image.

16. The system of claim 14, wherein the at least one processor is further programmed or configured to:
   communicate the digital image to a remote server that processes the digital image; and
   receive, from the remote server, the invoice data and the network location data.

17. The system of claim 14, wherein the at least one processor is programmed or configured to process the digital image by:
   extracting text from the digital image;
   generating, based at least in part on a location and/or pattern of the extracted text on the invoice, location and/or pattern data; and
   identifying, based at least in part on the location data and/or the pattern data, at least one of the following: a network location; an account identifier; a payor identifier; a payee identifier; and an invoice amount.

18. The system of claim 14, wherein the at least one processor is programmed or configured to, based on user input, launch an electronic wallet application.

19. The system of claim 18, wherein the at least one processor is further programmed or configured to obtain the account identifier from the electronic wallet application.

20. The system of claim 19, wherein the at least one processor processes the digital image, establishes the communication with the network location identified in the digital image, and inputs the payment information through the electronic wallet application.

21. A computer program product for settling an outstanding invoice issued by a payee, comprising at least one non-transitory computer-readable medium including program instructions that, when executed by at least one processor, cause the at least one processor to:
   capture, via at least one image capture device, a digital image of an invoice issued by a payee to a payor;
   process the digital image to identify in the digital image: (i) invoice data and (ii) a network location associated with the payee;
   automatically establish communication with the network location identified in the digital image, the network location being a bill-pay website; and
   automatically input payment information into one or more fields of the bill-pay website, the payment information including the invoice data and an account identifier associated with the payor.

* * * * *